United States Patent

[11] 3,593,080

| [72] | Inventors | Jack H. Reynolds<br>Bellbrook;<br>Ernest R. Schelling, Kettering, both of, Ohio |
|---|---|---|
| [21] | Appl. No. | 30,692 |
| [22] | Filed | Apr. 22, 1970 |
| [45] | Patented | July 13, 1971 |
| [73] | Assignee | The National Cash Register Company<br>Dayton, Ohio |

[54] MOTOR CONTROL CIRCUIT WITH PROVISION FOR PHASE REVERSAL AND DC BRAKING
10 Claims, 3 Drawing Figs.

[52] U.S. Cl. ............................................ 318/203 A,
318/207 R, 318/277, 318/289, 321/45 C, 321/66
[51] Int. Cl. ............................................ H02p 1/40
[50] Field of Search ............................................ 318/138,
203 A, 207 R, 227, 289; 321/45 C, 66

[56] References Cited
UNITED STATES PATENTS

| 3,181,046 | 4/1965 | Sutton | 318/207 R X |
|---|---|---|---|
| 3,183,425 | 5/1965 | Slawson | 318/227 |
| 3,268,742 | 8/1966 | Pinckaers | 318/227 X |
| 3,304,477 | 2/1967 | Wells et al. | 318/227 X |
| 3,444,448 | 5/1969 | Welch | 318/227 X |
| 3,500,151 | 3/1970 | Burk | 318/207 R X |

*Primary Examiner*—Gene Z. Rubinson
*Attorneys*—Louis A. Kline, John J. Callahan and Harry W. Barron ABSTRACT: A motor control circuit is described by which an induction stepping motor can be controlled to rotate either clockwise or counterclockwise, or to cease rotating. The control circuit uses silicon-controlled rectifiers to accomplish the necessary switching and includes a network which has the double function of a phase-shifting network and a silicon control rectifier commutating network.

PATENTED JUL 13 1971

3,593,080

| ROTOR ACTION | SCR'S 24 & 26 | SCR'S 28 & 30 | SCR 42 | SCR 44 |
|---|---|---|---|---|
| ROTATE CW | ON | OFF | OFF | OFF |
| HOLD CW | OFF | OFF | OFF | ON |
| HOLD CCW | OFF | OFF | ON | OFF |
| ROTATE CCW | OFF | ON | OFF | OFF |

INVENTORS
JACK H. REYNOLDS &
ERNEST R. SCHELLING

BY *Louis A. Kline*
*John J. Callahan*
*Harry W. Barron*
THEIR ATTORNEYS

MOTOR CONTROL CIRCUIT WITH PROVISION FOR PHASE REVERSAL AND DC BRAKING

This invention relates to a motor control circuit and, more particularly, to a circuit for controlling the amount and direction of rotation, or the stopping, of an induction-stepping motor.

When using an induction-stepping motor of the type illustrated by U.S. Pat. Nos. 2,982,872 or 3,148,319, both by G. O. Fredrickson, it is often desirous to rotate the shaft of the motor in one given direction for a certain length of time, to thereafter stop the shaft from rotating and hold it stationary in a fixed position, and finally, to rotate the shaft in the reverse direction and thereafter stop and hold it stationary again. In a motor of this type rotation may be caused by applying an alternating current voltage of a given frequency to one of the two sets of stator windings associated with the motor, thereby causing the shaft to rotate. These may be so applied by applying the alternating current voltage directly across one set of windings and through a 90 phase-shifting network across the other set of windings. The 90° phase-shifting network may simply be a series-connected resistor and capacitor. The value of the capacitance is chosen to resonate with running reactance of either set of stator windings (which are substantially equal) and the value of the resistance is chosen to limit the magnitude of the current in the two sets of stator windings to a substantially equal value. The direction of the rotation is determined by which set of stator windings the alternating current voltage is directly applied to; thus it becomes a simple matter of including a switch to enable rotation in either direction.

When the alternating current voltage is removed, the shaft will continue to rotate freely. This free rotation may be halted by including some sort of a mechanical brake or a permanent magnet in the housing the motor. Another manner by which the shaft can be halted is to apply a half-wave rectified alternating current voltage to only one of the two sets of windings and no voltage to the other set of windings.

The circuits of the prior art by which stepping motors are controlled as described above require the inclusion of mechanical switches to change from one mode of operation to another mode of operation. Mechanical switches are not easily controlled by automatic digital control circuits and as a consequence, these prior art circuits have limited utility as a part of automatic equipment. Thus, it is desirous to replace these mechanical switches with solid-state switching devices which are easily controlled by remote digital means.

An excellent solid-state switching device for replacing the mechanical switches in a motor control circuit is the silicon-controlled rectifier (SCR). An SCR will conduct current from its anode to its cathode while the anode is more positive than the cathode after a positive pulse is applied to the gate when the anode was more positive than the cathode. Once the cathode becomes more positive than the anode, the device will cease conducting and it will necessary to apply another pulse to the gate. However, an SCR cannot be turned off by merely removing the gate voltage; it is also necessary to make the cathode more positive than the anode. In most motor control circuits, this results in additional circuitry for each SCR used where one cannot wait until the end of the then occuring cycle of the alternating current voltage for the turnoff to occur. It becomes more complicated where only a positive voltage, such as direct current voltage or half-wave rectified alternating current voltage is to be switched on or off by an SCR. In this situation, additional circuitry is always necessary to make the cathode more positive than the anode, thereby adding complexity, expense and additional chances of failure to otherwise simple circuits.

In accordance with a preferred embodiment of this invention, there is provided a control circuit for intermittently causing the shaft of a motor having a pair of serially connected windings to rotate. This control circuit includes a pair of terminals between which said pair of windings are connected. A phase-shifting network is also connected between the terminals. The phase-shifting network includes a first and a second series-connected resistance and capacitance circuits. The first and second circuits are connected between the terminals so that a resistance of one and a capacitance of the other circuit is coupled to each terminal. There is further included means for selectively applying an alternating current voltage between one of the terminals and the junction of the windings and means for selectively applying a direct current voltage between the resistance and capacitance of one of the circuits and the junction of the windings. The alternating current voltage is applied when it is desirous for the shaft to rotate and the direct current voltage is applied when it is desirous for the shaft to cease rotating.

A specific embodiment of the invention is hereinafter described where reference is made to the following FIGS. in which:

FIG. 1 shows a circuit diagram of the motor control circuit;

Figure 2:
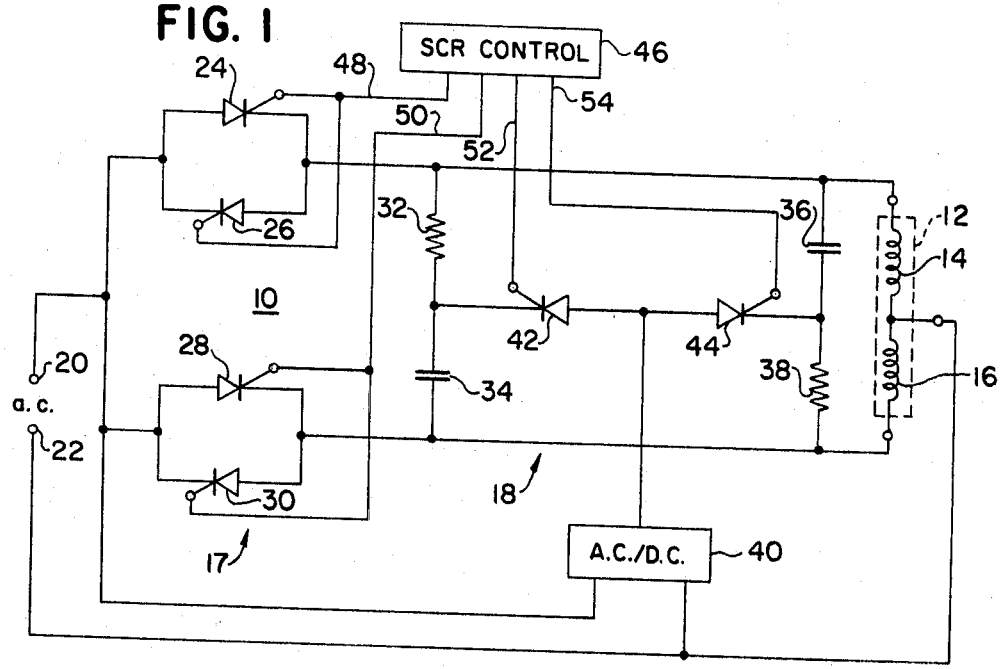
FIG. 2 is a flow diagram showing a preferred mode of operation of the circuit in FIG. 1.

Referring now to FIG. 1, there is shown a motor control circuit 10 which may be used to cause a shaft (not shown) of a motor 12 to rotate in either a clockwise direction (CW) or a counterclockwise (CCW) direction. Motor 12 has two sets of stator windings 14 and 16, which hereinafter are referred to as stator winding 14 and stator winding 16. Each of stator windings 14 and 16 may include a plurality of individual windings as shown by the above-noted Fredrickson patents. Control circuit 10 includes a direction determining network 17 for causing the application of the properly phased alternating current voltages to the proper stator windings for a given direction of rotation. Control circuit 10 further includes a phase-shifting network 18 for providing the proper phase-shifted alternating current voltage.

In circuit 10, an alternating current voltage is applied to input terminals 20 and 22. Terminal 20 is connected to both the anode of SCR 24 and to the cathode of SCR 26. The cathode of SCR 24 and the anode of SCR 26 are connected together and to one end of stator winding 14. The terminal 20 is also connected to the anode of SCR 28 and the cathode SCR 30. The cathode of SCR 28 and the anode of SCR 30 are connected together and to one end of stator winding 16. The other ends of stator windings 14 and 16 are connected together and to terminal 22.

Network 18 includes a first resistance 32 and a first capacitance 34 which are serially connected in parallel with stator windings 14 and 16 and a second capacitance 36 and a second resistance 38 which are serially connected in parallel with stator windings 14 and 16. The value of capacitances 34 and 36 can be computed by first determining what necessary total capacitance would be required to cause a resonant condition to exist between the total capacitance and the running reactance of either stator winding 14 or 16. Capacitances 34 and 36 are each made one-half this value. The value of resistors 32 and 38 can be computed by first determining the total resistance necessary to limit the magnitude of the current flowing through windings 14 and 16 to substantially equal values; resistors 32 and 38 are each made twice this value. In this way, the combination of resistor 32 and capacitor 34 in parallel with capacitor 36 and resistor 38 would be equal to the computed values and thus the proper phase-shifting and current-limiting functions are accomplished. Terminal 20 is further connected to one input of an alternating current to direct current (AC/DC) converter and terminal 22 is connected to the other input thereof. AC/DC converter 40 can be any conventional converter circuit, such as a series voltage regulator, or a full or halfway rectifier with a capacitor between the outputs thereof. The output of AC/DC converter 40 is coupled to the anodes of SCR,'s 42 and 44. The cathode of SCR 42 is connected to the junction between resistor 32 and capacitor 34 and the cathode of SCR 44 is connected to the junction of capacitor 36 and resistor 38. The magnitude of the direct current voltage provided by AC/DC converter 40 may be substantially equal to the peak magnitude of the alternating current voltage.

An SCR control circuit 46 is also provided and has four outputs 48, 50, 52, and 54. Output 48 is connected to the gate electrodes of each of the SCR's 24 and 26; output 50 is connected to the gate electrodes of SCR's 28 and 30; output 52 is connected to the gate electrode of SCR 42; and output 54 is connected to the gate electrode of SCR 44. The signal appearing at output 48 and output 50 will be a chain of pulses occurring at a frequency high with respect to the frequency of the alternating current voltage applied between terminals 20 and 22. For instance, where the frequency of the alternating current voltage is 60 Hertz (Hz.), the frequency of the pulses at outputs 48 and 50 may be 1,000 Hz. These chains of pulses will occur during the time it is desirous for the motor to rotate, with a chain of pulses appearing at output 48 when it is desirous for the motor to rotate in a clockwise direction and a chain appearing at output 50 when it is desirous for the motor to rotate in a counterclockwise direction. The signal appearing on lines 52 and 54 will be a single pulse and will occur when it is desirous for the motor to go from the rotating condition to the stopped condition. The signal will appear on line 52 if the motor had been rotating in a counterclockwise direction or if SCR 44 is conductive and it is desirous for the motor 12 to begin rotating in the counterclockwise direction and will appear on line 54 if the motor had been rotating in a clockwise direction or if SCR 42 is conduction and it is desirous for motor 12 to begin rotating in the clockwise direction.

Reference is now made to FIG. 2 where a flow diagram of one manner of operation of circuit 10 is shown. The various conditions the shaft of motor 12 may assume are to be rotating in a clockwise direction (Rotate CW), to be rotating in a counterclockwise direction (Rotate CCW), to be held stationary in a clockwise condition (Hold CW), and to be held stationary in a counterclockwise condition (Hold CCW). According to the manner of operation shown by FIG. 2, when the motor 12 is in the Rotate CW condition, it can go to the Hold CW condition; from the Hold CW condition, it can go back to the Rotate CW condition or to the Hold CCW condition; from the Hold CCW condition, it can go back to the Hold CW condition or to the Rotate CCW condition, and from the Rotate CCW condition, it can only go to the Hold CCW condition.

Figure 3:
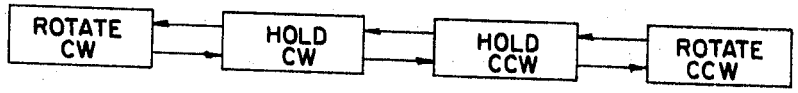
FIG. 3 is a chart showing the state of conduction of the various SCR's for each condition of operation.

FIG. 3 shows the condition of the various SCR's 24, 26, 28, 30, 42 and 44 during each condition of motor 12. The terminology "on" means that the SCR referred to is conductive and the terminology "off" means that the SCR referred to is nonconductive. Thus, from FIG. 3, it is seen that during the time motor 12 is in the Rotate CW condition, SCR's 24 and 26 will be on, that is the chain of pulses previously referred to will be appearing at output 48 of SCR control circuit 46. Similarly, when motor 12 is in the Hold CW condition, SCR 44 will be on, that is, as soon as it is desirous to go to the Hold CW condition, a pulse will appear at output 54 of SCR control circuit 46 and if motor 12 had previously been in the Rotate CW condition, the pulses appearing at output 48 will cease. When motor 12 is in the Hold CCW condition, SCR 44 will be on, that is a pulse will appear at output 52 of SCR control circuit 46 as soon as it is desirous to go to the Hold CCW condition and if motor 12 had been in the Rotate CCW condition, the pulses at output 50 will cease. Finally, when motor 12 is in the Rotate CCW condition, SCR's 28 and 30 will be on, that is, a chain of pulses will be appearing at output 50 of SCR control circuit 46.

Reference is again made to FIG. 1 where a description of the operation of circuit 10 will now be explained and how phase-shifting network 18 can commute previously conductive SCR's when a condition change occurs. It will first be assumed that motor 12 is in the Rotate CW condition. Therefore, a chain of pulses will be appearing at output 48 of SCR control circuit 46. As previously mentioned, these pulses will have a frequency which is high with respect to the frequency of the alternating current voltage at terminals 20 and 22. As the alternating current voltage enters each positive half-cycle, that is as it crosses the zero voltage level and becomes positive, SCR 24 will begin conducting as soon as a pulse form output 48 is applied to its gate. Since the chain of pulses at output 48 has a high frequency relative to the frequency of the alternating current voltage, a pulse will always occur very shortly after the zero crossing and SCR 24 will thereafter conduct for the remainder of that positive half-cycle. Thus, SCR 24 will normally conduct for substantially all of each positive half-cycle, and therefore it is unnecessary to synchronize the occurrence of the pulses at output 48 with the zero crossing of the alternating current voltage. While SCR 24 is conducting, the positive half-cycle of the alternating current voltage will be applied across stator winding 14 and a voltage shifted by 90° will be applied across stator winding As long as the alternating current voltage remains positive, this will remain the condition and the continuous pulsing of the gate of SCR 24 throughout the remainder of the positive half-cycle will have no effect.

When the alternating current voltage enters the negative half-cycle, that is goes from a positive value, through zero, and to a negative value, SCR 24 will cease conducting since its cathode becomes more positive than its anode and SCR 26 will begin conducting because of the continuous pulsing being applied to the gate thereof from output 48. SCR 26 will remain conductive during the entire negative half-cycle of the alternating current voltage and during this time a negative half-cycle of the alternating current voltage will appear across stator winding 14 and a voltage shifted by 90° from this voltage will appear across stator winding 16. This procedure will continue for each cycle of the alternating current voltage and each cycle will cause motor 12 to rotate one step in the clockwise direction. HE he amount of each step will be determined by the design of motor 12.

When it is desirous to halt this rotation, the chain of pulses at output 48 will cease and a pulse will appear at output 54. This action should occur during the positive half-cycle of the alternating current voltage. The pulse at output 54 will cause SCR 44 to become conductive. The direct current voltage from AC/DC converter 40 will thereafter be applied through SCR 44 and appear as a positive-going step voltage at the junction of capacitor 36 and resistor 38. Since the voltage across capacitor 36 cannot change instantaneously, this will cause the voltage at the cathode of SCR 24 to sharply rise by the amount of the step voltage. This, in turn, will reverse bias SCR 24 and cause it to cease conducting. Thereafter, capacitor 36 will charge up to the direct current voltage and a constant current will flow from AC/DC converter 40 through SCR 44 and resistor 38 into winding 16 and back to AC/DC converter 40 while no current will flow through winding 14. Thus, the shaft of motor 12 will cease rotating almost immediately without the necessity of waiting until the end of the positive half-cycle. It should be noted that capacitor 36 serves the dual function of being a part of the phase-shifting network 18 and turning SCR 24 off when SCR 44 is turned on.

If the motor had been in the Rotate CCW condition, that is rotating in the counterclockwise direction, SCR's 28 and 30 would have been alternately conducting on the respective positive and negative-half cycles of the alternating current voltage due to pulses appearing at output 50 of SCR control circuit 46, and thus, an alternating current voltage would be applied to stator winding 16 and a 90° phase-shifted alternating current voltage would be applied to stator winding 14. When it is desired that motor 12 cease rotating, that is, to go to the Hold CCW condition, a pulse will be applied at output 52 of SCR control circuit 46 during the positive half-cycle of the alternating current voltage. This pulse will render SCR 42 conductive. By the same actions as explained above, a step voltage will be applied through capacitor 34 and cause SCR 28 to cease conducting and thus half the rotation immediately.

When it is desired to go from the Hold CW condition to the Rotate CW condition, it is necessary to first insure that SCR 44 is conducting. Assuming for the present time this condition is met, clockwise rotation will begin as soon as the pulses begin appearing at output 48 of SCR control circuit 46, which should take place during the positive half-cycle of the alternating current voltage. Just prior to the application of these pulses, capacitor 36 will be charged to the direct current voltage in such a manner that its plate on the side coupled to the cathode of SCR 44 is positive with respect to its plate on the side coupled to the cathode of SCR 24. When the first pulse is applied to the gate of SCR 24, it will begin conducting and the voltage at the cathode of SCR 24 will begin to rise. Since the voltage across capacitor 36 cannot change instantaneously, this rise in SCR 24 cathode voltage will cause a rise in SCR 44 cathode voltage, which previously had been nearly equal to the direct current voltage. Thus, the cathode of SCR 44 will become more positive than its anode and SCR 44 will cease conducting. Thus, in addition to its previous two functions, capacitor 36 serves the third function of causing SCR 44 to turn off when going from the Hold CW to the Rotate CW conditions.

A similar set of events occurs when it is desirous to go from the Hold CCW to the Rotate CCW conditions where SCR's 28, 30 and 42 and capacitor 34 are the operable elements.

When it is desired to go from the Hold CCW to the Hold CW condition, a pulse is caused to appear at output 54 of SCR control circuit 46. This causes SCR 44 to become conductive and apply a step voltage through SCR 44, capacitor 36, and resistor 32 to the cathode of SCR 42. This increase in SCR 42 cathode voltage causes SCR 42 to become nonconductive. It should also be noted that this causes a one-half step rotation of motor 12 since the changing from SCR 42 being conductive to SCR 44 being conductive causes a change in the direct current voltages across stator windings 14 and 16. This one-half step rotation can be corrected later when the condition is changed from Hold CW to Hold CCW, as then there will be a one-half step rotation in the other direction. Here capacitor 36 serves a fourth function of turning off SCR 44 when going from the Hold CCW to the Hold CW conditions.

To go from the Hold CW to the Hold CCW conditions, a pulse appears at output 52 of SCR control circuit 46 and capacitor 34 and resistor 38 operate as did capacitor 36 and resistor 32 described above.

It should be noted that it is possible to halt clockwise rotation by turning on SCR 42 instead of SCR 44. In this case, SCR 24 would not become nonconductive until the end of the positive half-cycle however. Similarly, it is possible to halt counterclockwise rotation by turning on SCR 44 instead of SCR 42, but again, rotation continues until the end of the positive half-cycle.

It is also possible to initiate clockwise rotation when SCR 42 is conducting rather than SCR 44, if the magnitude of the alternating current voltage appearing at the cathode of SCR 24 is greater than the value of the direct current voltage appearing there. However, in this case, SCR 42 will not be turned off until the peak magnitude of the alternating current voltage is reached, thereby causing a delay in SCR 42 turnoff. In a similar manner counterclockwise rotation may be initiated when SCR 44 is conductive rather than SCR 42. Also rotation in either direction may be initiated if both SCR's 42 and 44 are conductive although one of SCR's 42 and 44 will remain on until the positive peak of the alternating current voltage is reached.

What we claim is:

1. A control circuit for intermittently causing the shaft of a motor having a pair of serially connected windings to rotate comprising:

a pair of terminals between which said pair of windings are connected;

a phase-shifting network connected between said terminals, said phase-shifting network including first and second series-connected resistance and capacitance circuits, said first and second circuits being connected such that a resistance of one of said circuits and a capacitance of the other of said circuits are coupled to each terminal;

means for selectively applying an alternating current voltage between one of said terminals and the junction of said windings; and means for selectively applying a direct current voltage between the junction between the resistance and capacitance of one of said first and second circuits and the junction of said windings;

said alternating current voltage being applied when said shaft is to rotate and said direct current voltage being applied when said shaft is to cease rotating.

2. The invention according to claim 1 wherein said means for selectively applying said alternating current voltage includes a current-dependent self-latching switch means which, when conductive, is rendered nonconductive by the application of said direct current voltage.

3. The invention according to claim 2 wherein said current-dependent self-latching switch means includes a pair of silicon-controlled rectifiers which are coupled in parallel between a source terminal connectable to a source of alternating current voltage and one of said terminals between which said windings are connected, said silicon-controlled rectifiers being poled in opposite directions.

4. The invention according to claim 1 wherein said means for selectively applying said direct current voltage includes a current-dependent self-latching switch means which, when conductive, is rendered nonconductive by the application of said alternating current voltage.

5. The invention according to claim 4 wherein said current-dependent self-latching switch means is a silicon-controlled rectifier which is connected between a source terminal connectable to a source of direct current and said junction between the resistance and reactance of said one circuit.

6. The invention according to claim 4 wherein said means for selectively applying said alternating current voltage includes a current-dependent self-latching switch means which, when conductive, is rendered nonconductive by application of said direct current voltage.

7. The invention according to claim 6 wherein said current-dependent self-latching switch means included in said means for selectively applying said alternating current voltage includes a pair of silicon-controlled rectifiers which are coupled in parallel between a second source terminal connectable to a source of alternating current voltage and one of said terminals between which said windings are connected, said silicon-controlled rectifiers being poled in opposite directions.

8. A control circuit for applying signals to an induction-stepping motor for causing a shaft associated with said motor to rotate in a given one of two directions or to become stationary, said motor being of type which has a pair of serially connected windings which cause said rotation when an alternating current voltage of one phase is applied across one of said windings and an alternating current voltage of a different phase is applied across the other of said windings, said control circuit comprising:

a phase-shifting network which includes a first resistance and a first capacitance serially coupled in parallel with said pair of motor windings and a second resistance and a second capacitance serially coupled in parallel with said pair of motor windings, said resistances and capacitances of said network being coupled such that said first resistance and second capacitance are coupled to one side of said pair motor windings and said second resistance and first capacitance are coupled to the other side of said pair of motor windings;

a pair of terminals connectable to a source of alternating current voltage;

at least one pair of silicon-controlled rectifiers which are connected in parallel and poled in opposite directions and which are coupled between a selected one of said terminals and said one side of said pair of motor windings, each one of said pair of silicon-controlled rectifiers having an anode, a cathode and a gate, there being a current-conductive path from said anode to said cathode only when the voltage potential at said anode is more positive than the voltage potential at said cathode and after selective controls signals are applied to said gate;

means for coupling the other of said terminals to the junction of said pair of motor windings;

a second pair of terminals connectable to a source of direct current voltage;

a third silicon-controlled rectifier having an anode, a cathode and a gate, said third silicon-controlled rectifier having a current-conductive path from said anode to said cathode only when the voltage potential at said anode is more positive than the voltage potential at said cathode and after a selective control signal is applied to said gate, said third silicon control rectifier being coupled between one of said second pair of terminals and the junction of said first resistance and first capacitance; and means for coupling the other one of said second pair of terminals to the junction of said pair of motor windings.

9. The invention according to claim 8 wherein said selective-control signals are applied to only one of either of said pair of silicon-controlled rectifiers or said third silicon-controlled rectifier at any given time; and wherein the application of said control signal to the gate of said one of said pair of silicon-controlled rectifiers or said third silicon controlled rectifier causes the cathode of the other of said pair of silicon-controlled rectifiers or said third silicon-controlled rectifier to become more positive than the anode thereof, thereby causing said other of said pair of silicon-controlled rectifiers or said third silicon-controlled rectifier to become nonconductive.

10. The invention according to claim 8 wherein said control circuit further includes:

a fourth silicon-controlled rectifier having an anode, a cathode and a gate electrode, said fourth silicon-controlled rectifier having a current-conductive path from said anode to said cathode only when the voltage potential at said anode is more positive than the voltage potential at said cathode and after a selective control signal is applied to said gate, said fourth silicon-controlled rectifier being coupled between said one of said second pair of terminals and the junction at said second resistance and second capacitance; and means for causing any alternating current voltage which may be applied to said terminals to be applied to said one side of said pair of windings in the event said shaft is to rotate in one direction and to the other side of said windings in the event said shaft is to rotate in the other direction.